July 23, 1940.  O. KREMMLING ET AL  2,208,905
MOLDING ROLLER APPARATUS FOR THE PRODUCTION OF ARTICLES
FROM DOUGH AND OTHER PASTELIKE MATERIALS
Filed Dec. 30, 1938

Inventors
Otto Kremmling
Carl Jacoby

By
Attorney

Patented July 23, 1940

2,208,905

UNITED STATES PATENT OFFICE 2,208,905

MOLDING ROLLER APPARATUS FOR THE PRODUCTION OF ARTICLES FROM DOUGH AND OTHER PASTELIKE MATERIALS

Otto Kremmling and Carl Jacobi, Hamersleben, Germany

Application December 30, 1938, Serial No. 248,644
In Germany February 10, 1936

7 Claims. (Cl. 107—8)

The invention relates to improvements in molding roller apparatus for the production of articles from dough and other paste-like materials used in bakery, confectionery and sweet-manufacture, for example marzipan. The improvements are applied with particular advantage to a molding apparatus with two molding drums which roll upon each other. The drums are each provided with molding recesses mutually completing each other to form molds, with a peripheral pressing-in or forcing roll taking the material from a hopper. In some cases, there is provided a releasing device for the unit articles molded from their halves as formed in each drum, with the releasing device in the gap between the molding drums.

In order to achieve a particularly dense homogeneous filling of the individual molding recesses, the pressing space formed by the several co-acting rolls and drums is closed by a stripping member which projects in the direction of rotation of the molding drums into the gap between them and is preferably wedge shaped. Preferably, the upper closure of the two pressing-in or forcing rolls—particularly in the case of the selection of a rather large pressing space—is effected by a special closure member between the upper parts of the said rolls.

The adjustability is preferably attained not only by homogeneous filling of the stripping member which in some cases may carry releasing needles, in relation to the peripheral surface of the molding drums, but also by provision for varying the distance between the peripheral surfaces of the pressing-in or forcing rolls and the closure member which, for instance, may be of block or flap shape and may be rectilinearly adjustable or swingably mounted.

If the molding roller apparatus is to be employed for the production of articles pressed or stamped on one side only, the pressing space may be divided by a partition extending between the stripping member and closure member. Only one-half of the pressing space is then required to be charged with paste.

In the latter case, one molding drum may be replaced by a supporting or mounting roller for a discharge band bearing against the other molding drum. This permits of a particularly tight closure in the case of the use of the apparatus for the production of one-sided articles if the stripping member projecting into the molding-drum gap in the direction of rotation is employed. It is especially appropriate to make the partition project so far into the gap formed by the arriving discharge band and the molding drum that the partition can serve as a supporting member for the stripping member. The stripping member and partition may even be made in one piece.

This stripping member projecting into the gap in the direction of rotation also creates favorable conditions for the use of a simple release device consisting of needles located in grooves in the molding drums.

Several embodiments of the invention by way of example are illustrated in the accompanying drawing.

Figure 1:
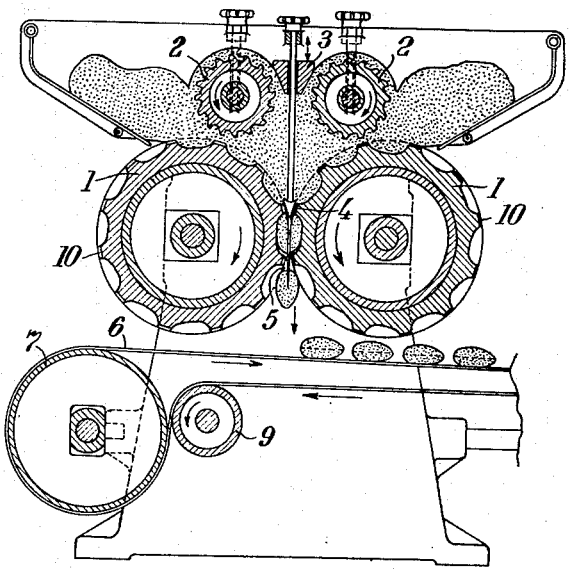
Fig. 1 shows a molding roller apparatus, in central vertical section, for the production of articles pressed on both sides.

When the apparatus is employed for the production of articles pressed on two sides (Fig. 1), two molding drums 1 are provided above which, within the paste hopper, two forcing rolls 2 turn in the direction for feeding the paste into the gap between the molding drums (see the arrows indicating the directions of rotation). The pressing space formed by the four drums and rolls is substantially closed, for the purpose of increasing the pressure, by an upper closure member 3 which may be designed, in the manner of Fig. 1, as a vertically adjustable block. Due to the adjustability of the closure member 3, the pressure inside the pressing space can be regulated as desired. The same purpose is served by making the forcing rolls 2 adjustable in relation to the molding drums 1. This adjustment is effected by the setting knobs shown in the drawing which act upon screw spindles. A stripper or doctor blade 4, preferably of wedge shape, projects, forming a lower closure for the pressing space, into the gap formed between the molding rollers 1. The two edges of this stripper bearing against the peripheral surfaces of the molding rollers 1 ensure that the quantity of paste pressed into the molding recesses under considerable but regulatable pressure is cut off (or the superfluous part is wiped or scraped off) shortly before reaching the uniting point for the two halves of the article. The two said halves are then united immediately afterwards. In order to remove the articles thus formed safely from the molding recesses, use is preferably made of needles 5 which may be located in grooves 10 in the molding rollers 1. On these needles, the articles are pushed along by the rear edges of the molding recesses until they separate automatically under their own weight from the said edges or are pushed off by the next succeeding articles and fall more rapidly on to the conveyor band 6 disposed thereunder. The lower article located upon the needle points in Fig. 1 is moving toward band 6. In certain special cases, namely when materials of low adhesive power are being dealt with, even the needles 5 may be dispensed with. The needles may, for example, be replaced by companion threads as the releasing means, such as are known for sweetmeat-pressing machines for the production of chains of sweetmeats.

In order to be able to use the apparatus for the production of articles pressed on one side only, the pressing space is preferably divided by the central partition 8', whereby only one-half of the feeding detail of the apparatus is employed. In this case, but one forcing roller 2' is used, the delivery of the other forcing roller being blocked off by an adjustable closure member 3', arranged at the lower end of the forcing roller. The doctor element 4' is supported at its lower end in the partition 8'. In the form shown in Figure 2, the band 6' extends around the active molding drum 1', which is formed with the grooved formation 10', similar to that of Figure 1, passes over the top and around the roller 7' and beneath a guide roller 9'.

Figure 2:
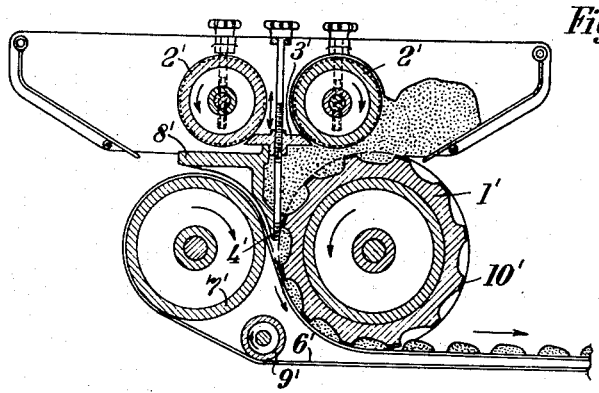
Fig. 2 shows a molding roller apparatus, in a similar view, for the production of articles pressed on one side.
Figure 3:
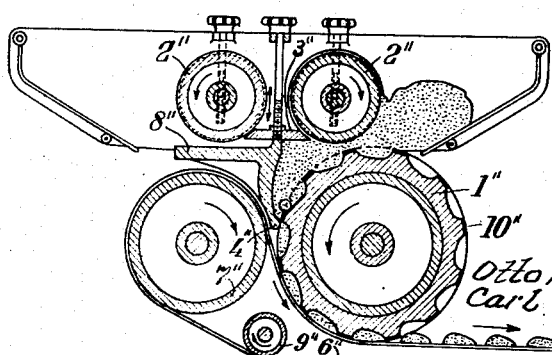
Fig. 3 shows a modification of the apparatus in accordance with Fig. 2 in a similar view.

In Figure 3 the parts are similar to those employed in Figure 2, except that the doctor blade does not extend to the bottom of the partition 8'' as in Figure 2. Figure 3 employs a single forcing roller 2'', a closure member 3'' and a single molding roller 1'', formed with channels 10'', with the material held in the roller during molding by a band 6'' passing over a roller 7'', and over a guide roll 9''. In this form, the doctor 4'' is formed with the lower end of the partition 8''.

Having now particularly described and ascertained the nature of our said invention and in what manner the same is to be performed, we declare that what we claim is:

1. A molding apparatus including a drum peripherally formed with molding recesses, means for feeding the material to the drum, a scraping member cooperating with the drum at the point of maximum compression, a duplicate drum having material receiving recesses to register with the recesses in the first mentioned drum during operation of the parts, and means arranged between the drums to cooperate with the compressed material in both drums and separate said material from the recesses of both drums as a unit.

2. A molding apparatus including a drum peripherally formed with molding recesses, means for feeding the material to the drum, a scraping member cooperating with the drum at the point of maximum compression, and means for compressing the material in the drum, said means including a duplicate drum having material receiving recesses to register with the recesses in the first mentioned drum during operation of the parts, and means arranged between the drums to cooperate with the compressed material in both drums and separate said material from the recesses of both drums as a unit, said means consisting of a needle supported to lie between the recessed portions of the drums and terminating well below the line connecting the centers of the drums.

3. A rotary dough molding machine, including a hopper having an open bottom, a molding roll below the hopper at one side of the opening and having dough forming recesses in its periphery, a pressure roll below the other side of said opening and cooperating with the molding roll to force dough into said recesses, a depending doctor blade extending into the space between said rolls and engaging the face of the molding roll to remove excess dough, and a pair of spaced feed rolls located in said hopper and arranged to force dough from the sides of the hopper through the opening and toward the center thereof.

4. The dough molding machine of claim 3, characterized by having a partition member extending across the hopper with its sides in proximity to the feeding rolls and having the doctor blade supported from the partition member.

5. The dough molding machine of claim 3, characterized by having the pressure roll provided with peripheral recesses adapted to register with the first mentioned recesses as the rolls rotate and having the doctor blade of wedge form for simultaneous engagement with both rolls.

6. The dough molding machine of claim 3, characterized by having a partition member located centrally above the space between the molding and pressure rolls and having means for adjusting the partition member vertically toward and from said molding and pressure rolls, whereby to regulate the pressure of the dough being fed to said molding and pressure rolls.

7. The dough molding machine of claim 3, characterized by having needles extending downwardly from the doctor blade between the pressure and molding rolls and having the pressure roll provided with peripheral recesses coacting with the recesses in the first mentioned roll.

OTTO KREMMLING.
CARL JACOBI.